E. C. DENNERT.
TRACTOR.
APPLICATION FILED MAY 4, 1918.
1,320,535.
Patented Nov. 4, 1919.
2 SHEETS—SHEET 2.
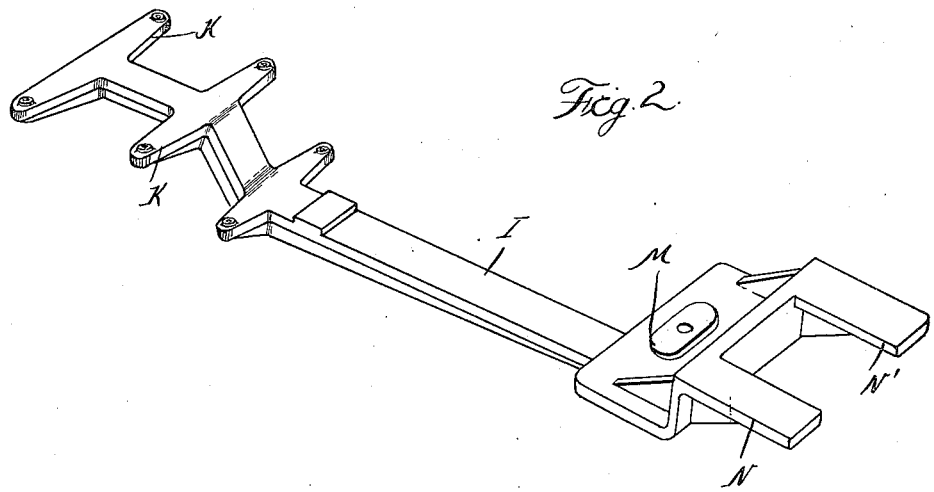
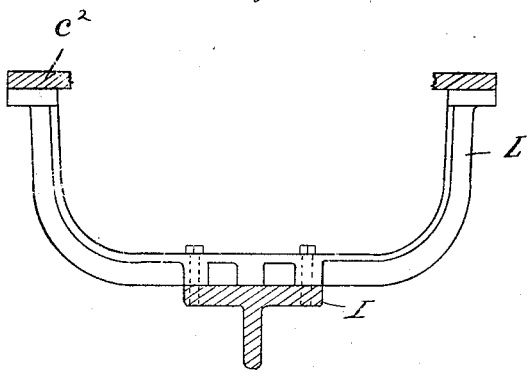
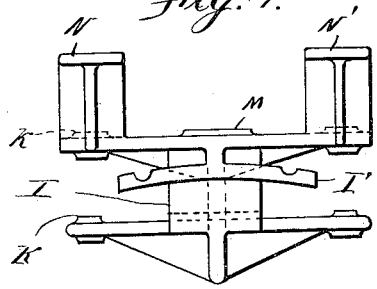
Inventor
Edward C. Dennert

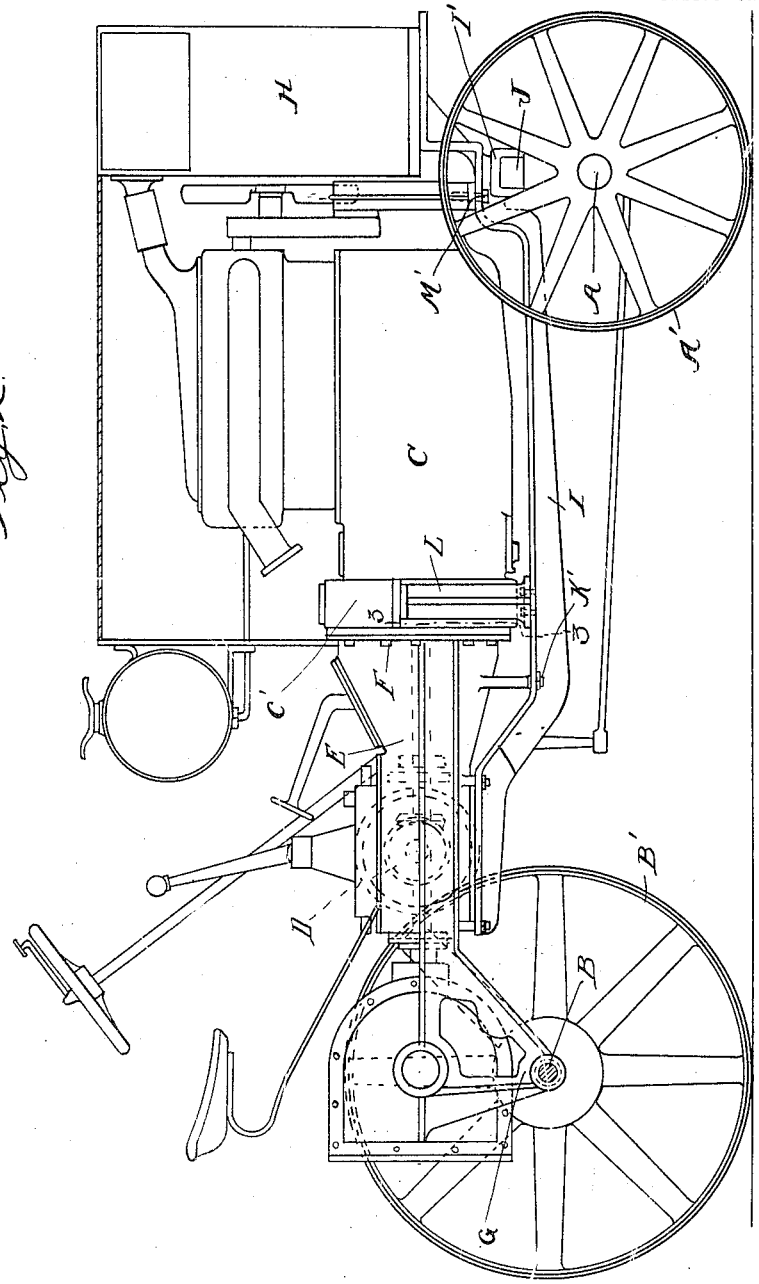

UNITED STATES PATENT OFFICE.

EDWARD C. DENNERT, OF DETROIT, MICHIGAN.

TRACTOR.

1,320,535.  Specification of Letters Patent.  Patented Nov. 4, 1919.

Application filed May 4, 1918. Serial No. 232,455.

*To all whom it may concern:*

Be it known that I, EDWARD C. DENNERT, a citizen of the United States of America, residing at Detroit, in the county of Wayne and State of Michigan, have invented certain new and useful Improvements in Tractors, of which the following is a specification, reference being had therein to the accompanying drawings.
The invention relates to tractors and one object of the invention is to obtain a reinforcing support for the engine and the transmission, which may be used with any engine and which will accurately position the transmission with respect to the engine. Another object is to obtain a common support for both the engine and the radiator, and furthermore, to obtain a three-point support for the engine. Other objects reside in the novel arrangements and combinations of parts as more fully hereinafter set forth.

In the drawings:

Figure 1 is a side elevation of the tractor to which my invention is applied;
Fig. 2 is a perspective view of the reinforcing support;

Fig. 3 is a cross section on the line 3—3 of Fig. 1;

Fig. 4 is a front end view of the reinforcing support.

A and B are respectively the front and rear axles of the tractor upon which are respectively mounted the steering and drive ground wheels A' and B'. C is the engine, and D the transmission suitably connected to the engine and also connected to the rear axle B through differential gearing (not shown). The housing E incloses and supports the transmission, preferably of integral construction, and is secured to the bell-housing C' of the engine by the stud bolts F. The housing has the depending portion G rotatably engaged by the rear axle B. H is the radiator for cooling the water passing through the engine, this radiator being mounted forward of the engine and suitably connected thereto.

To reinforce the transmission housing E and the engine C, the support or supporting arm I is provided having near its forward end the depending lateral arms I' secured to the spring J extending transversely of the tractor above the front axle. This support is preferably of T cross section and has the plurality of spaced bearings K at its rear for carrying the transmission housing E, the housing being secured to the support by means of the stud bolts K'. For supporting the rear end of the engine C, the support or supporting arm I has the bifurcated upwardly-extending arms L, secured to the head of the T and embracing the lower portion of the bell housing C', which latter is provided with the laterally-extending projections C² adapted to rest upon and be secured to the upper ends of the bifurcated arms. The support or supporting arm I near to and located above the lateral arms I' has the bearing portion M upon which the forward end of the engine C rests and is secured thereto by the stud bolt M'. The support or supporting arm I has its forward end bifurcated to form the forwardly-extending portions N and N' upon which is mounted the radiator H. The support has an upper longitudinal contour such that it will accommodate the lower contours of the engine and transmission housing and the bearing portions of the support are arranged so that when the engine and transmission housing are secured thereto, they will be in accurate alinement.

From the above description, it is seen that the support or suspension arm overlaps the transmission housing and is secured thereto and supports the engine. The construction is such that the suspension arm carries the stress, which would normally be upon the housing and engine adjacent to their points of connection, so that a much stronger construction is obtained. Furthermore, the suspension arm positions the transmission housing with respect to the engine so that the assembly of the tractor is greatly facilitated.
Still another important point is that the suspension arm has a three-point bearing for the engine, and furthermore, supports the radiator in operative relation to the engine.

What I claim as my invention, is:

1. In a tractor, the combination with front and rear axles, of an engine and driving mechanism between said engine and one of said axles, a housing carrying said driving mechanism and extending between said last mentioned axle and said engine, and a support carrying said engine and extending between the other of said axles and said housing, said support being secured to said housing.

2. In a tractor, the combination with front and rear axles, an engine and driving mechanism between said engine and rear axle, of a housing inclosing said driving mechanism and extending from said engine to said rear axle, and a supporting arm supporting said engine and overlapping said housing and secured thereto, said arm supported upon the front axle.

3. In a tractor, the combination with front and rear axles, an engine, a radiator, and driving mechanism for the rear axle, of a housing inclosing said driving mechanism and extending from the engine to the rear axle, a supporting arm supporting said engine and extending between said housing and front axle, said arm overlapping said housing and secured thereto and having a portion for carrying said radiator.

4. In a tractor, the combination with an engine and driving mechanism, of a housing for said driving mechanism carrying the same and connected to said engine, and a supporting arm having a plurality of spaced points for the support of said housing, and said arm also providing a three-point support for said engine.

5. In a tractor, the combination with an engine, of a supporting arm of T cross section beneath said engine provided with a point of support for the front end of said engine, and bifurcated arms secured to said supporting arm and extending transversely thereof, the outer ends of said bifurcated arms each forming a point of support for the rear end of said engine.

6. In a tractor, the combination with an engine and a radiator, of a supporting arm providing a three-point support for said engine and a bifurcated portion for supporting said radiator.

7. In a tractor, the combination with an engine and a radiator, of a reinforcing arm extending longitudinally beneath said engine and directly supporting the same, said arm provided with an integral portion directly supporting said radiator.

8. In a tractor, the combination with an engine and driving mechanism, of a housing for said driving mechanism carrying the same and secured to said engine, and a supporting arm having a plurality of spaced points for the support each of said housing and engine.

In testimony whereof I affix my signature.

EDWARD C. DENNERT.

Copies of this patent may be obtained for five cents each, by addressing the "Commissioner of Patents, Washington, D. C."